Dec. 26, 1950 C. HETTINGER 2,535,573
MACHINE FOR STRIP-ICING CONFECTIONS
Original Filed Aug. 15, 1947 2 Sheets-Sheet 1
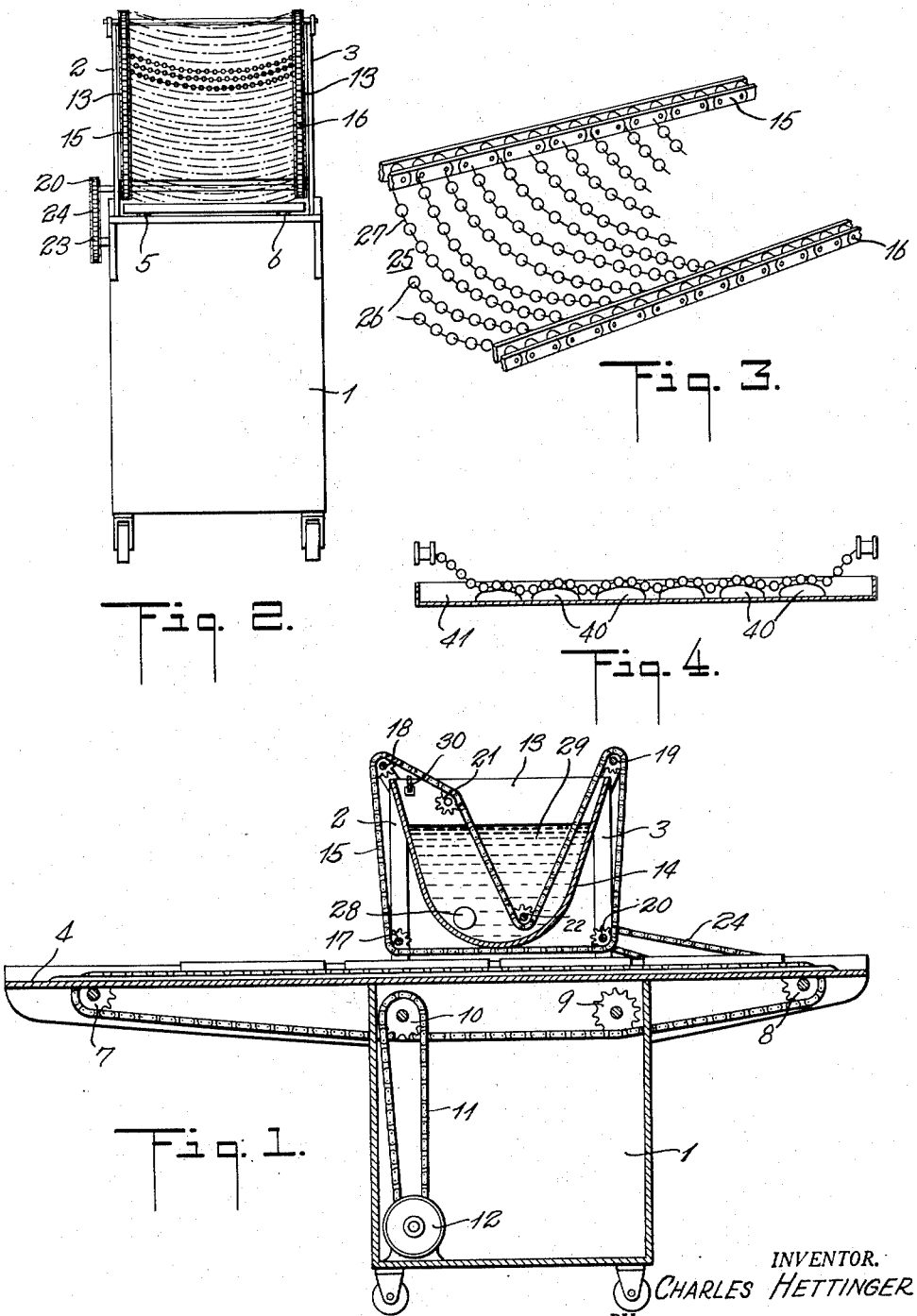
INVENTOR.
CHARLES HETTINGER
BY
Jones & Roe
ATTORNEYS Dec. 26, 1950      C. HETTINGER      2,535,573

MACHINE FOR STRIP-ICING CONFECTIONS

Original Filed Aug. 15, 1947      2 Sheets—Sheet 2

INVENTOR.
CHARLES HETTINGER
BY
Jones a Roe
ATTORNEYS

Patented Dec. 26, 1950

2,535,573

UNITED STATES PATENT OFFICE 2,535,573

MACHINE FOR STRIP-ICING CONFECTIONS

Charles Hettinger, West Englewood, N. J.

Substituted for abandoned application Serial No. 768,753, August 15, 1947. This application October 20, 1950, Serial No. 191,261

3 Claims. (Cl. 91—2)

My invention comprehends a machine for strip-icing or strip-frosting confections, as buns, rings, etc., commonly known in the trade as sweet goods. This application is a substitute for application S. N. 768,753 filed August 15, 1947 and now abandoned.

According to this invention, a pair of conveyors are suitably mounted on a support with an interposed bed, preferably extending beyond either side of the support. The upper stretch of one conveyor feeds the confections as the lower stretch of the other conveyor—laden with liquid icing of a predetermined consistency—deposits the icing on the confections. I style the latter conveyor as an icing applicator. It derives its name from the fact that it incorporates a plurality of transverse flexible members equipped with spherical elements which pick up liquid icing provided in a tank, and apply it in strips simultaneously to a multiplicity of confections, thereby accomplishing with machinery what formerly was done in a more or less slipshod manner by hand.

One embodiment of the invention is shown in the accompanying drawings, in which:

Fig. 1 is a longitudinal section of the complete machine.

Fig. 2 is an end view of the machine.

Fig. 3 is a perspective of a fragment of the applicator.

Fig. 4 is a transverse section of the applicator conveyor illustrating the manner in which the applicator elements drape themselves about the confections.

Figure 5:
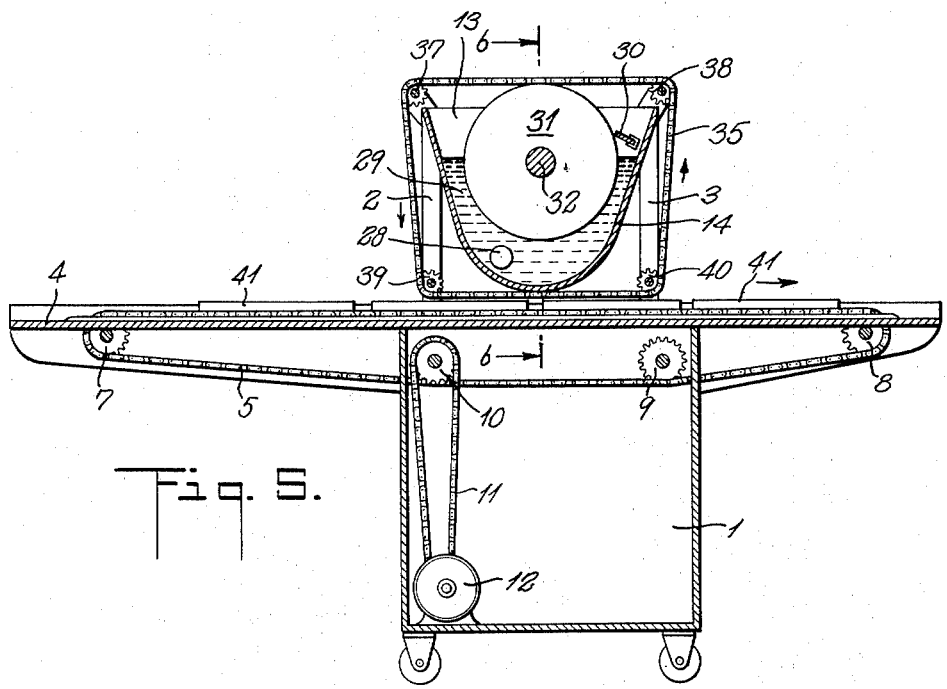
Fig. 5 is a view similar to Fig. 1 illustrating a modified form of applicator.

Referring in detail to the drawings, I designates a portable housing or support having pairs of elongated brackets 2—3 extending from the top of opposite sides and provided with a longitudinal bed 4 interposed therebetween. Operating between brackets 2—3 and over bed 4, are endless chain conveyors 5—6 which are trained over terminal sprockets 7—8, idler sprockets 9, and transmission sprocket 10 connected by chain 11 to any suitable source of power, as motor 12.

Directly above housing I are a pair of spaced upright plates 13 with an intermediate tank 14 open at its upper end. Two widely separated endless chain conveyors 15—16 are passed around and into the tank, and supported by pairs of sprockets 17, 18, 19, 20, 21 and 22 suitably disposed at the corners of plates 13 and in the tank 14. Power for operating chains 15—16 in consonance with chains 5—6 is derived from shaft 23 and chain 24 connected to sprocket 20.

Noting particularly Figs. 1 to 4 inclusive of the drawing, it will be observed that chains 15—16 are spanned by a plurality of transverse applicators 25 and that each applicator consists of relatively small perforated bead-like spheres 26 strung on a thread 27, and lying slack between the chains.

Towards the bottom of tank 14 is located an immersion heater 28 to maintain icing 29 at proper temperature, and at the top of the tank a wiper 30 is arranged to take care of the surplus icing carried by the applicators.

Figure 6:
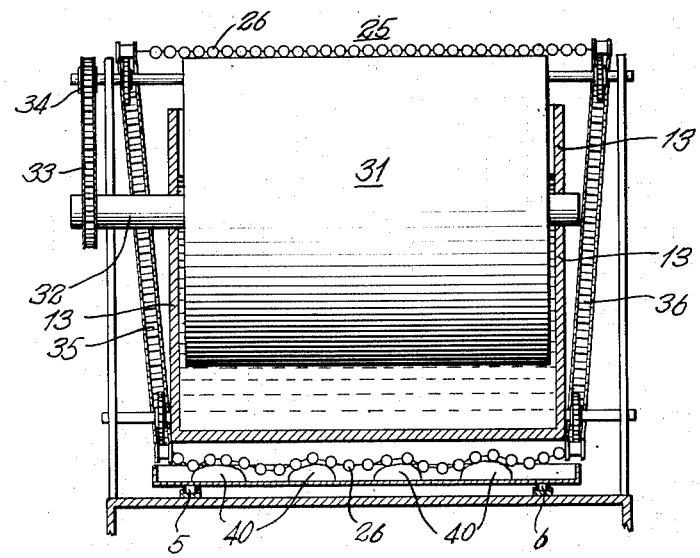
Fig. 6 is a vertical sectional elevation taken on line 6—6 of Fig. 5.

In Figs. 5 and 6, I have exhibited a modified form of the icing applicating means, which is not infrequently preferred to the type previously described in connection with Figs. 1 to 4 inclusive. The modification involves a similar tank 13, but in lieu of the applicator operating within the tank, a drum 31 is mounted on shaft 32, which in turn is supported transversely of the tank and is suitably connected by chain 33 to sprocket 34. Further, chains 35—36, see Fig. 6, converge from the top to the bottom and are trained over sprockets 37, 38, 39 and 40, all of which are disposed exteriorly of the tank. From this arrangement it follows that the applicators 25 are maintained taut upon the upper stretch of chains 35—36, to receive the icing transferred by drum 31, and slack upon their lower stretch to enable the icing to be draped about the buns. Any suitable means (not shown) may be utilized for adjusting sprockets 37 to 40 inclusive longitudinally of their respective shafts.

Having in mind Figs. 1 to 4 inclusive, buns, coffee rings, or the like confections, as 40, are placed in rows in pans 41, and the pans properly positioned upon the upper stretch of chains 5—6. The motor 12 is energized, whereupon the chains with the superimposed pans are moved at a moderate speed longitudinally of bed 4. Simultaneously, chains 15—16, with their applicators, travel through the icing or frosting 29 in tank 14 upon their upper stretch. The icing adheres to the spheres 26, and as the chains move upwardly, wiper blade 30 rids the applicators of any surplus icing and it is precipitated in the tank. The chains continue in their path downwardly around one end of the tank, and parallel bed 4 between sprockets 17—20 in their lower stretch. At this point—due to the synchronized action of the two sets of chains 5—6 and 15—16—the slack applicators 25 drape themselves about the top of the buns or rings 40—the applicators are virtually self-conforming (see Fig. 4). And coincident with the contact of the bead-like spheres, the icing is deposited on the confections in strips. In this manner one or more pans completely filled with confections may be strip-iced at one time.

In respect of the modification shown in Figs. 5 and 6, the operation is similar, excepting that drum 31 serves to transfer the icing 29 in tank 14 to the applicators.

I claim:

1. Confection icing mechanism comprising a support, an endless conveyor mounted on the support and having an upper horizontally movable run, an applicator support disposed above the endless conveyor and provided with guide members, a plurality of which are positioned just above the upper run of the endless conveyor, an applicator-conveyor trained around the guide members whereby the lower run of the applicator moves substantially parallel to and just above the upper run of the conveyor, said applicator comprising spaced endless elements, a plurality of slack members spanning said elements, said slack members comprising flexible units substantially longer than the distance between the elements and having protuberances, means for simultaneously driving the conveyor and applicator, and means for applying the icing to the applicator.

2. Confection icing mechanism comprising a support, an endless conveyor mounted on the support and having an upper horizontally movable run, an applicator support disposed above the endless conveyor and provided with guide members, a plurality of which are positioned just above the upper run of the endless conveyor, an applicator-conveyor trained around the guide members whereby the lower run of the applicator moves substantially parallel to and just above the upper run of the conveyor, said applicator comprising spaced endless elements, a plurality of slack members spanning said elements, said slack members comprising flexible units substantially longer than the distance between the elements and having protuberances, means for simultaneously driving the conveyor and applicator, and a tank mounted on the applicator support and containing icing in which the upper reach of the applicator is immersed.

3. Confection icing mechanism comprising a support, an endless conveyor mounted on the support and having an upper horizontally movable run, an applicator support disposed above the endless conveyor and provided with guide members, a plurality of which are positioned just above the upper run of the endless conveyor, an applicator-conveyor trained around the guide members whereby the lower run of the applicator moves substantially parallel to and just above the upper run of the conveyor, said applicator comprising spaced endless elements, a plurality of slack members spanning said elements, said slack members comprising flexible units substantially longer than the distance between the elements and having protuberances, means for simultaneously driving the conveyor and applicator, a tank mounted on the applicator support and containing icing and a roller in the tank, the roller designed to transfer icing from the tank to the upper reach of the applicator.

CHARLES HETTINGER.

REFERENCES CITED

The following references are of record in the file of this patent and in the parent case.

UNITED STATES PATENTS

| Number | Name | Date |
|---|---|---|
| 1,153,585 | Vicars | Sept. 14, 1915 |